May 8, 1934.  M. SEIDEL  1,958,073
FILTERING FAUCET
Filed April 29, 1932
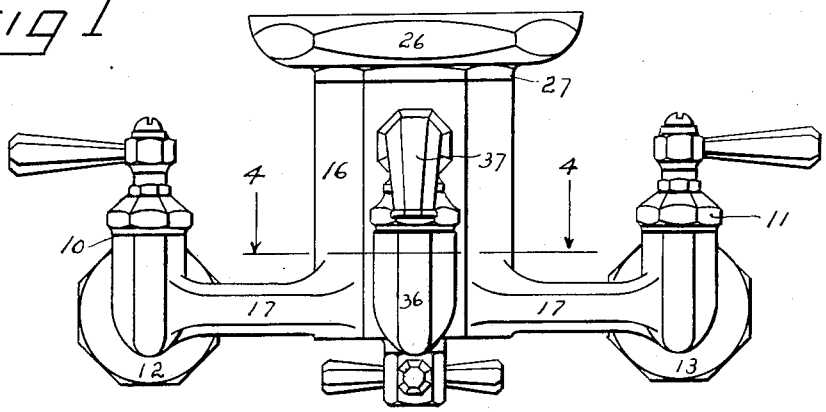
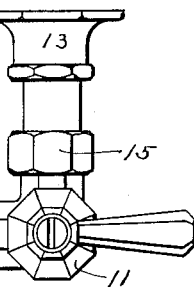
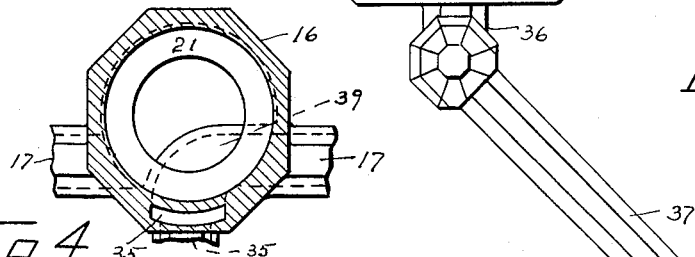
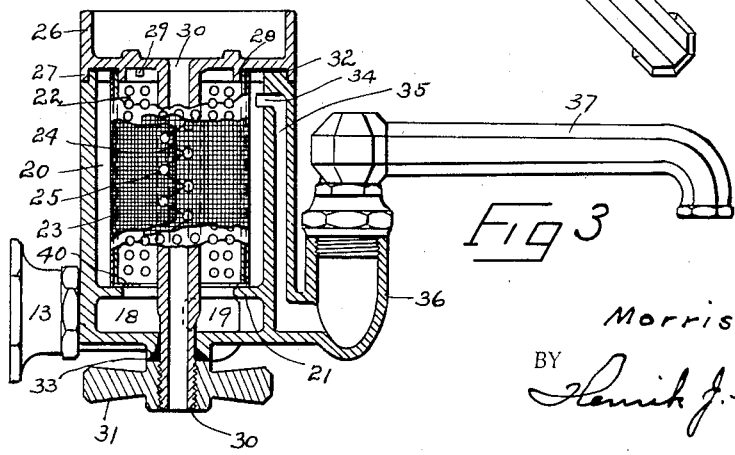
INVENTOR.
Morris Seidel
BY
ATTORNEY.

Patented May 8, 1934

1,958,073

UNITED STATES PATENT OFFICE 1,958,073

FILTERING FAUCET

Morris Seidel, Brooklyn, N. Y., assignor of one-half to Leon Sanders, New York, N. Y.

Application April 29, 1932, Serial No. 608,152

5 Claims. (Cl. 210—78)

The invention relates to faucets, particularly water faucets such as are used in kitchens. It is well known that notwithstanding the efforts made by most municipalities to provide properly filtered water, the water in the average city, when delivered from the faucet, does contain considerable foreign matter and impurities.

Water filters for household use have long been on the market. In the present invention the filter is contained within the faucet and may be said to form an integral part thereof. The purpose of the invention is to provide a filter-containing faucet which will not occupy much more space than that occupied by the ordinary faucet; in which the water will be effectively filtered as it is drawn from the faucet; and through which either cold or hot water, or a mixture of both, may be drawn.

Another object is to provide a faucet of highly sanitary construction in which the filtering means may be easily removed for cleaning. A further object is to utilize a part of the device as a soap holder, and to provide effective and sanitary means for draining this holder. A still further object is to provide a faucet of neat appearance, simple construction, which can be manufactured at a comparatively low cost, and which has no parts readily clogged or obstructed.

These and various other objects and advantages will be readily understood from the following description and from the accompanying drawing of preferred embodiments in which, however, modifications may be made without departing from the scope of the appended claims. In the drawing Fig. 1 is a front elevation of the faucet, Fig. 2 a top view of same, Fig. 3 a cross-sectional side elevation, and Fig. 4 a fragmental sectional top view taken on line 4—4 in Fig. 1 and showing a slight modification.

Referring now to Figs. 1, 2 and 3, the device consists, as here shown, of two faucets 10 and 11 which may be connected to the regular hot and cold water supply pipes by the flanges 12 and 13 and the unions 14 and 15. The faucets are connected to a filter container 16 by ducts 17.

The filter container consists of a lower compartment 18 into which the openings 19, in the ducts 17, lead. The lower compartment is separated from an upper compartment 20 by an annular flange 21. A screen 22 is supported on top of this flange and on the outside of this screen a filtering fabric 23 is laced by means of a cord 24 drawn over a plurality of buttons 25.

The cover 26, which fits over the filtering chamber, is made to constitute a soap holder. Its lower side is formed with a rim 27 which fits over the filter container, and with an annular projection 28 which fits inside the screen. A projection 29, fitting in a notch in the upper edge of the filter container, assures that the cover is always placed in the right position.

A tubular member 30 is cast integrally with the cover and extends downwardly through the device. It is threaded at its lower end and provided with a nut 31. A gasket 32 seals the joint between the cover and the top of the filter container, while a gasket 33 seals the joint between this and the nut 31. Any water accumulating in the soap holder will drain through the tubular member.

An overflow opening 34 in the inner wall of the filter container leads to a passage 35 through which the filtered water flows into the nozzle support 36. A nozzle 37 is swiveled on this support. In some instances it is not necessary to filter the hot water. In such cases the hot water inlet 17 is connected directly to the lower end of the passage 35 by a duct 39, as plainly shown in Fig. 4.

The device operates in the following manner. The water entering through either or both of the faucets 10 and 11 flows into the lower chamber 18 and rises inside the screen 22. As the water is forced through the screen and through the filter fabric, all its impurities are removed. When the level of the water in the chamber 20 reaches the port 34 it flows through this port and out through the passage 35, support 36 and nozzle 37.

The location of the port 34 in the upper part of the filter chamber is an important feature in that it stops the flow of water through the nozzle as soon as the faucets are closed. If this port was located in the lower part of the chamber the water would continue to flow, after the faucets were closed, until the filter chamber empties.

When the filtering fabric 23 needs cleaning, the nut 31 is unscrewed and the soap holder lifted out. As the screen fits snugly on the annular projection 28, it is withdrawn with the soap holder. After the screen is removed from the soap holder, the cord 24 is unlaced so that the fabric may be removed and cleaned. When the device is again assembled the lower edge of the fabric is tucked in under the screen as shown at 40.

From the foregoing it will be seen that I have succeeded in providing a filtering faucet which is not only simple in construction and positive in its operation, but which is very easy to clean and to keep in sanitary condition.

Having described my invention and its advantages, what I claim as new and wish to protect by Letters Patent is:

1. In a faucet, a chamber, a water-tight closure for said chamber, a filter contained substantially concentrically within said chamber, a faucet-controlled water inlet in said chamber leading the water flowing therethrough to the interior of the filter, an overflow opening located near the top of the chamber through which the water after passing through the filter flows, an outlet in the lower part of the device connected with said overflow, another faucet-controlled water inlet leading directly to the outlet of the device, and means for discharging the water from said outlet.

2. In a faucet, a chamber, a water-tight closure for said chamber, a filter contained substantially concentrically within said chamber, a faucet-controlled water inlet in said chamber leading the water flowing therethrough to the interior of the filter, an overflow opening located near the top of the chamber through which the water after passing through the filter flows, an outlet in the lower part of the device connected with said overflow opening, and another faucet-controlled water inlet leading directly to the outlet of the device.

3. In a faucet, a chamber, a water-tight closure for said chamber, a filter contained substantially concentrically within said chamber, a faucet-controlled water inlet in said chamber leading the water flowing therethrough to the interior of the filter, an overflow opening located near the top of the chamber through which the water after passing through the filter flows, an outlet in the lower part of the device connected with said overflow opening, another faucet-controlled water inlet leading directly to the outlet of the device, the water-tight closure constructed to form a soap holder, and a pipe leading downwardly through the chamber for discharging the drainage from said soap holder at a point below the device.

4. In a faucet, a chamber, a water-tight closure for said chamber, a filter contained substantially concentrically within said chamber, a faucet-controlled water inlet in said chamber leading the water flowing therethrough to the interior of the filter, an overflow opening located near the top of the chamber through which the water after passing through the filter flows, an outlet in the lower part of the device connected with said overflow opening, another faucet-controlled water inlet leading directly to the outlet of the device, the water-tight closure constructed to form a soap holder, a pipe leading downwardly through the chamber for discharging the drainage from said soap holder at a point below the device, and means associated with the end of said pipe for clamping the closure over the chamber.

5. In a faucet, a chamber, a water-tight closure for said chamber, a filter contained within said chamber, a faucet-controlled water inlet in said chamber leading the water flowing therethrough to the interior of the filter, an overflow opening located near the top of the chamber through which the water after passing through the filter flows, an outlet connected with said overflow opening, and another faucet-controlled water inlet leading directly to the outlet of the device.

MORRIS SEIDEL.